United States Patent
Itoigawa et al.

(10) Patent No.: US 6,797,899 B2
(45) Date of Patent: Sep. 28, 2004

(54) ACCELERATION SWITCH (75) Inventors: Kouichi Itoigawa, Aichi (JP); Hitoshi Muraki, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 0 days.

(21) Appl. No.: 10/296,650

(22) PCT Filed: May 28, 2001

(86) PCT No.: PCT/JP01/04446
§ 371 (c)(1),
(2), (4) Date: Nov. 26, 2002

(87) PCT Pub. No.: WO01/92896
PCT Pub. Date: Dec. 6, 2001

(65) Prior Publication Data
US 2003/0136654 A1 Jul. 24, 2003

(30) Foreign Application Priority Data
May 29, 2000 (JP) .......................... 2000-158000

(51) Int. Cl.⁷ .................... H01H 35/02; H01H 35/14
(52) U.S. Cl. .................... 200/61.48; 200/61.45 R; 200/61.49
(58) Field of Search ............ 200/61.45 R, 61.48–61.53; 307/10.1–10.8; 280/735

(56) References Cited
U.S. PATENT DOCUMENTS 4,855,544 A * 8/1989 Glenn .................. 200/61.45 R
4,991,682 A   2/1991 Kuntz et al.
5,177,331 A * 1/1993 Rich et al. ............ 200/61.45 R
5,657,831 A   8/1997 Furui
5,828,138 A * 10/1998 McIver et al. ............ 307/10.1
5,856,645 A   1/1999 Norton
6,080,944 A * 6/2000 Itoigawa et al. ...... 200/61.45 R
6,336,658 B1 * 1/2002 Itoigawa et al. ............ 280/735
6,586,691 B2 * 7/2003 Itoigawa et al. ......... 200/61.49

FOREIGN PATENT DOCUMENTS

| EP | 0 997 920 A1 | 5/2000 |
| JP | 51-111381 | 9/1975 |
| JP | 9-269336 A | 10/1997 |
| JP | P2000-88878 A | 3/2000 |
| JP | P2000-106070 A | 4/2000 |
| WO | WO 01/92896 A1 * | 12/2001 |

* cited by examiner

Primary Examiner—James R. Scott
(74) Attorney, Agent, or Firm—Crompton, Seager & Tufte, LLC

(57) ABSTRACT

An acceleration switch that operates even when acceleration is applied to the acceleration switch from a direction other than a predetermined detection direction. The acceleration switch includes a movable portion, which has a movable electrode, and a fixed electrode. The movable portion includes an inertial weight moved in accordance with the application of acceleration, a beam portion for pivotably supporting the inertial weight, and a plurality of flexible plates that are arranged in the inertial weight and each have a distal end in which the movable electrode is located and are flexed separately from one another. The flexible plates separately move to contact the fixed portion when acceleration is applied from a direction other than a predetermined direction.

8 Claims, 11 Drawing Sheets

ACCELERATION SWITCH

BACKGROUND OF THE INVENTION

The present invention relates to an acceleration switch, and more particularly, to an acceleration switch that includes a movable portion, which has a movable electrode, and a fixed electrode and that moves the movable portion when acceleration is applied so that the movable electrode contacts the fixed electrode.

Many automobiles are nowadays equipped with air bag systems. An air bag system generally includes an air bag, an ignitor, and an electronic control unit (ECU). The ECU includes an acceleration sensor, which detects a sudden change in acceleration when the vehicle collides. A semiconductor acceleration sensor is used as such type of an acceleration sensor. The semiconductor acceleration sensor includes, for example, a strain gauge arranged on a beam, which supports a mass. The ECU activates the ignitor when determining that the applied acceleration is greater than or equal to a predetermined value. The thermal expansion of heated air instantaneously inflates a folded air bag.

The ECU may function erroneously when affected by electromagnetic waves generated by surrounding devices. Therefore, the employment of a mechanical acceleration switch (i.e., safing sensor) in addition to an electronic acceleration sensor has been proposed. The mechanical acceleration switch is less affected by the electromagnetic waves than the electronic acceleration sensor.

Figure 1A:
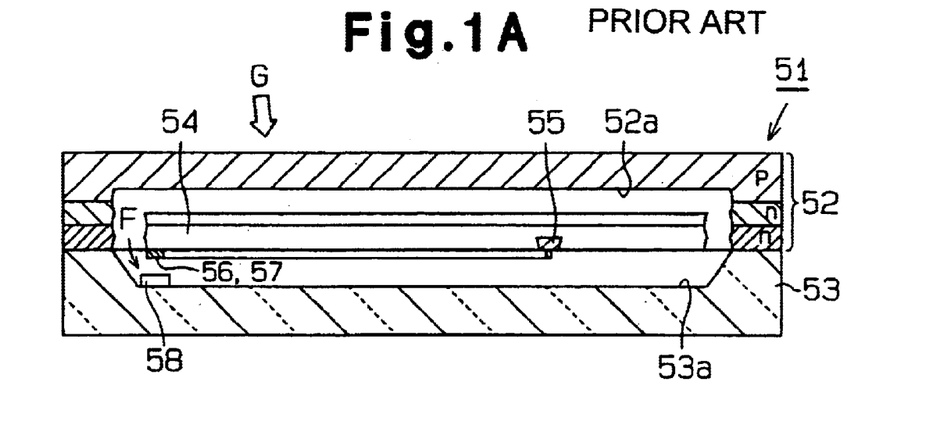
FIG. 1A is a schematic cross-sectional view of a prior art acceleration switch
Figure 1B:
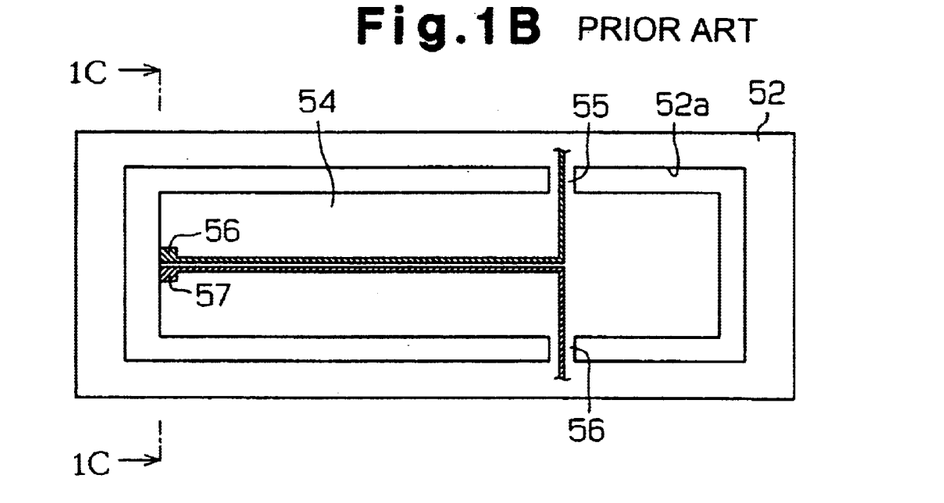
FIG. 1B is a schematic bottom view of a silicon chip configuring the acceleration switch of FIG. 1A.
Figure 1C:
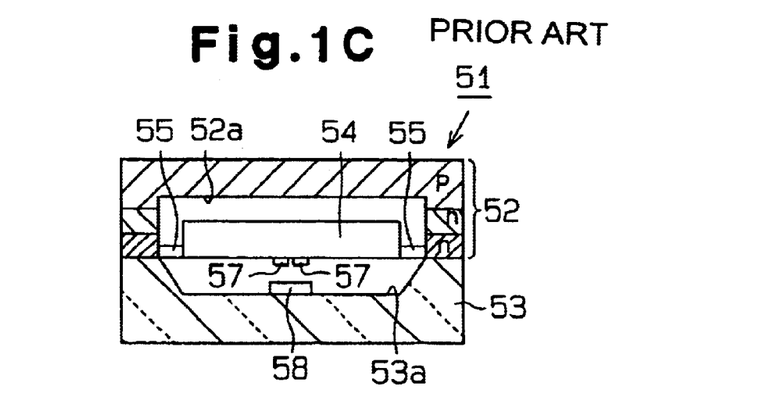
FIG. 1C is a cross-sectional view taken along line 1C—1C in FIG. 1B.

FIGS. 1A to 1C schematically show the structure of a prior art acceleration switch 51.

The acceleration switch 51 includes a silicon chip 52 and a substrate 53, which are attached to each other. The silicon chip 52 has a hollow portion 52a, in which a generally rectangular parallelepiped inertial weight 54 is arranged. A beam 55 is provided on each long side of the inertial weight 54 at a position offset from the middle of the long side. The beams 55 connect the inertial weight 54 and the silicon chip 52. The beams 55 support the inertial weight 54 at a position offset from the center (center of gravity) of the inertial weight 54. Two movable electrodes 56, 57 are arranged close to each other on the lower surface of the inertial weight 54 at a generally middle part of the distal end that is on the side farther from the beams 55.

A hollow portion 53a is defined in the upper surface of the substrate 53. A fixed electrode 58 is arranged in the hollow portion 53a at a position corresponding to the movable electrodes, 56, 57. The movable electrodes 56, 57 are normally spaced from the fixed electrode 58.

When acceleration is applied to the acceleration switch 51, inertial force is applied to the inertial weight 54 such that the inertial weight 54 pivots about the beam 55 in a downward direction (the direction indicated by arrow G in FIG. 1A). When the acceleration applied to the acceleration switch 51 becomes greater than or equal to a predetermined value, the inertial weight 54 pivots in a direction indicated by arrow F in FIG. 1A, and the movable electrodes 56, 57 contact the fixed electrode 58. When the acceleration is small, the inertial weight 54 does not pivot about the beam 55. Thus, the fixed electrode 58 does not contact the movable electrode 56. The acceleration switch 51 operates only when the applied acceleration is greater than or equal to the predetermined value.

Figure 2A:
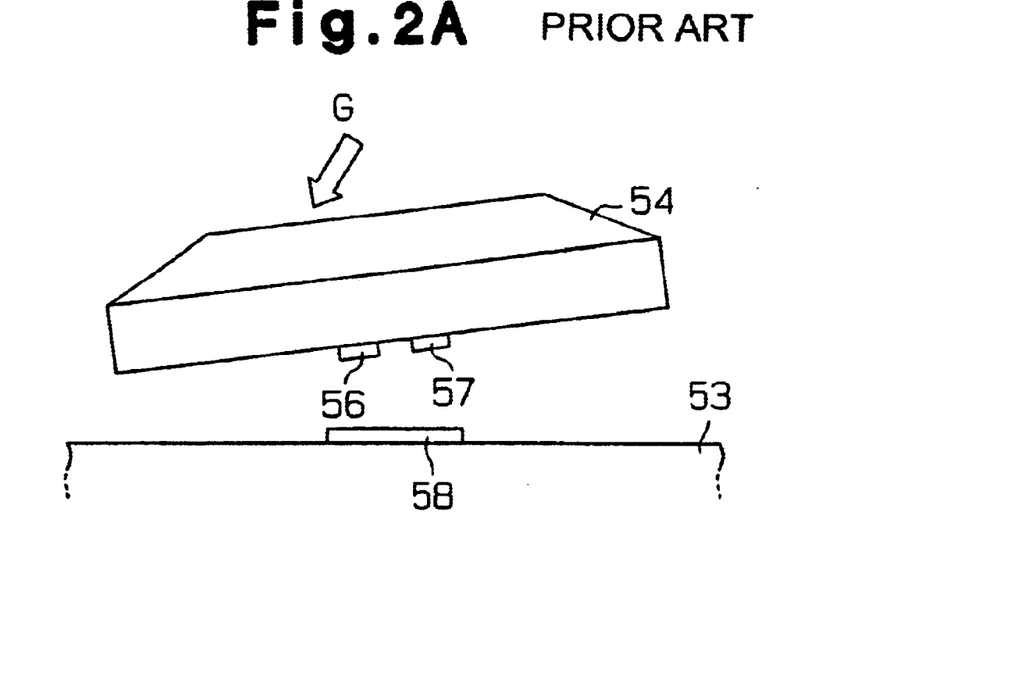
FIGS. 2A and 2B are schematic enlarged views showing the movement of a movable portion when acceleration is applied to the prior art acceleration switch from an unexpected direction.
Figure 2B:
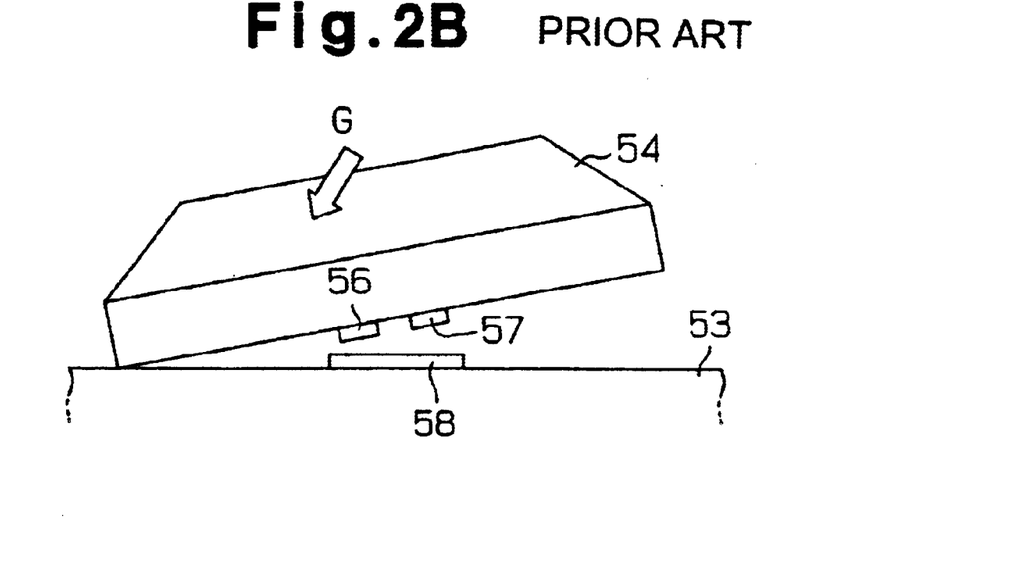

When acceleration is applied to the acceleration switch 51 from a direction other than a predetermined detection direction, inertial force is applied to the inertial weight 54 from a direction indicated by arrow G in FIG. 2A. In such case, the inertial weight 54 pivots in a twisted state, as shown in FIG. 2A. In such state, an edge of the lower surface of the inertial weight 54 first contacts the substrate 53, as shown in FIG. 2B. This restricts the movement of the inertial weight 54. The two movable electrodes 56, 57, which are on the same plane, may not contact the fixed electrode 58. In other words, contact failure may occur in the acceleration switch 51 when acceleration is applied from a direction other than the predetermined detection direction.

BRIEF SUMMARY OF THE INVENTION

It is an objective of the present invention to provide an acceleration switch, which operation is guaranteed even when acceleration is applied to the acceleration switch from direction other than the a predetermined detection direction.

One perspective of the present invention provides an acceleration switch including a movable portion, which has a movable electrode, and a fixed electrode, in which movement of the movable portion in accordance with the application of acceleration causes the movable electrode to contact the fixed electrode. The acceleration switch has the movable portion, which includes an inertial weight moved in accordance with the application of acceleration, a beam portion for pivotably supporting the inertial weight, and a plurality of flexible plates arranged in the inertial weight, each of which has distal end, in which the movable electrode is located, and is flexed separately from one another.

In this structure, since the plurality of flexible plates, each provided with the movable electrode, flex separately, the movable electrodes move separately when the flexible plate are flexed. Therefore, even if only one of the movable electrodes contacts the fixed electrode when acceleration is applied to the acceleration switch from an unexpected direction, the other movable electrode moves separately from the former movable electrode and contacts the fixed electrode. Therefore, the activation of the acceleration switch is guaranteed even when acceleration is applied from an unexpected direction.

BRIEF DESCRIPTION OF THE DRAWINGS

The invention, together with objects and advantages thereof, may best be understood by reference to the following description of the presently preferred embodiments together with the accompanying drawings as described below.

DETAILED DESCRIPTION OF THE PREFERRED EMBODIMENTS

Figure 3A:
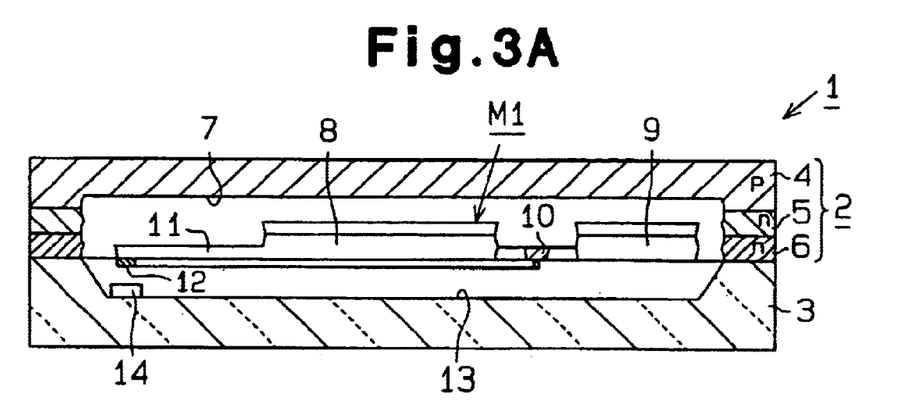
FIG. 3A is a schematic cross-sectional view of an acceleration switch according to one embodiment of the present invention.

FIG. 3A is a schematic cross-sectional view of an acceleration switch 1 according to one embodiment of the present invention. As shown in FIG. 3A, the acceleration switch 1 is formed by attaching a substrate 3 and a silicon chip 2 to each other.

The silicon chip 2 includes a chip body 4 and a double-layer structure of epitaxial growth layers 5, 6. The chip body 4 is formed from parallelepiped and formed from p-type monocrystal silicon of (110) orientation. The epitaxial growth layers 5, 6 are superimposed on one side of the chip body 4 and formed from n-type monocrystal silicon. The thickness of the chip body 4 is 500 $\mu$m to 600 $\mu$m. The thickness of each of the epitaxial growth layers 5, 6 is about 15 $\mu$m and, the thickness of the two epitaxial growth layers 5, 6 is about 30 $\mu$m. To facilitate illustration, the thickness of the epitaxial growth layers 5, 6 is illustrated thicker than actual. A rectangular hollow portion 7 is defined in the bottom side of the chip body 4. The hollow portion 7 has a depth of about 100 $\mu$m and is thus deeper than the thickness of the two epitaxial growth layers 5, 6. The hollow portion 7 accommodates a movable portion M1, which includes an inertial weight 8, a balancer 9, a beam portion, or beam 10, and a plurality of (two in the present embodiment) flexible plates 11.

Figure 3B:
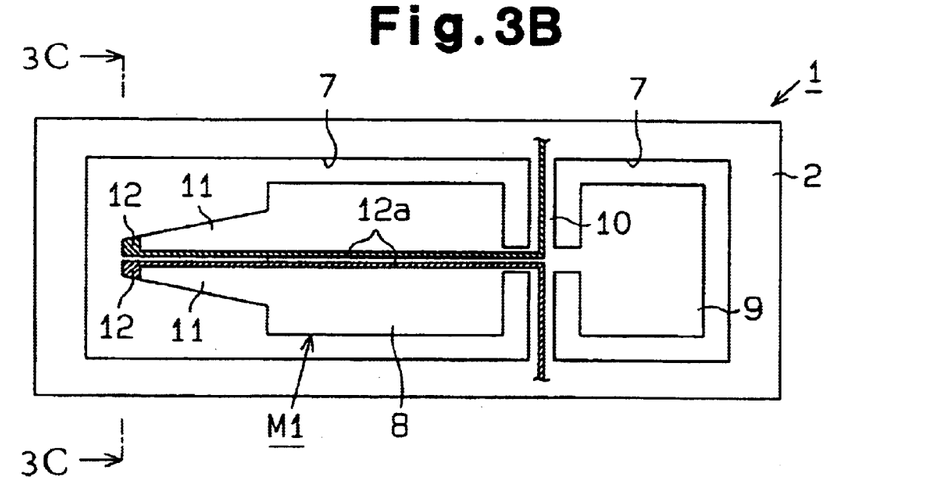
FIG. 3B is a schematic bottom view of a silicon chip configuring the acceleration switch of FIG. 3.
Figure 3C:
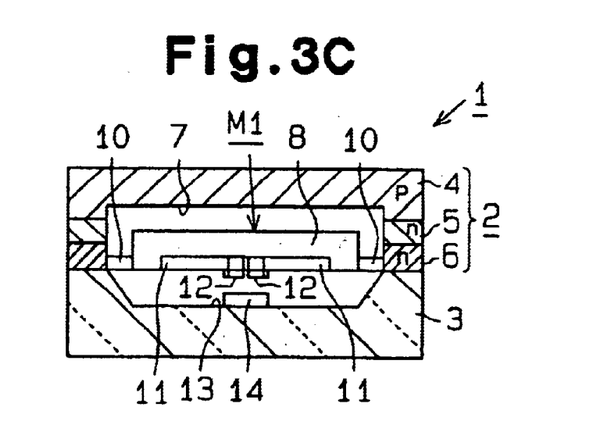
FIG. 3C is a cross-sectional view taken along line 3C—3C in FIG. 3B.
Figure 4A:
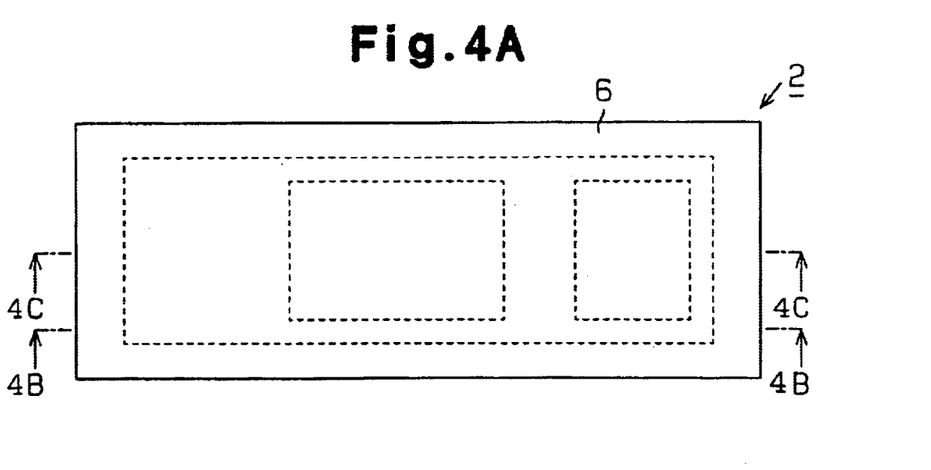
FIG. 4A is a schematic plan view of the silicon chip illustrating a procedure for manufacturing the acceleration switch of FIG. 3A.
Figure 4B:
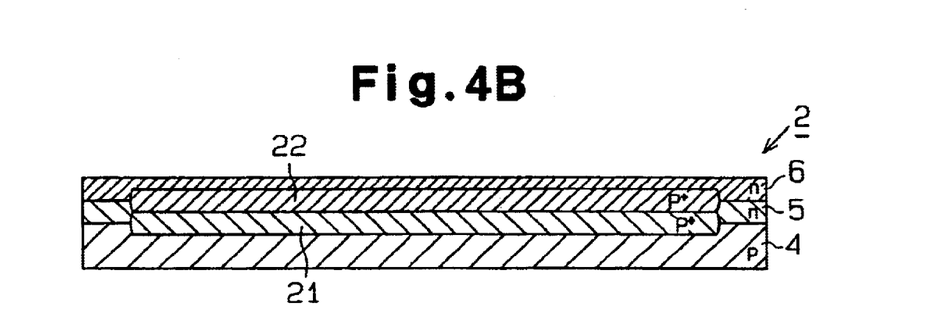
FIG. 4B is a cross-sectional view taken along line 4B—4B in FIG. 4A.
Figure 4C:
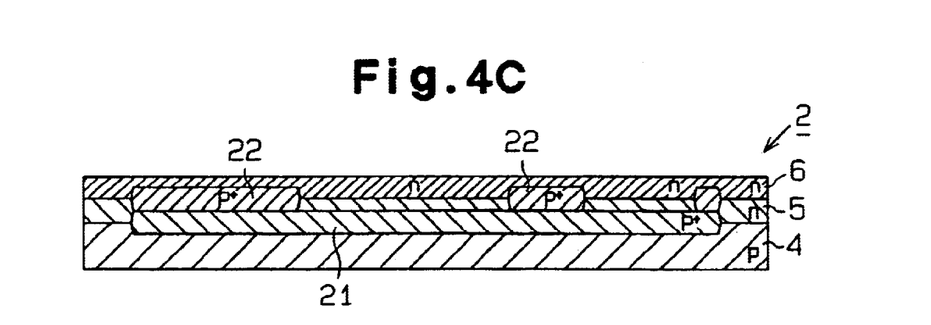
FIG. 4C is a cross-sectional view taken along line 4C—4C in FIG. 4A.
Figure 5A:
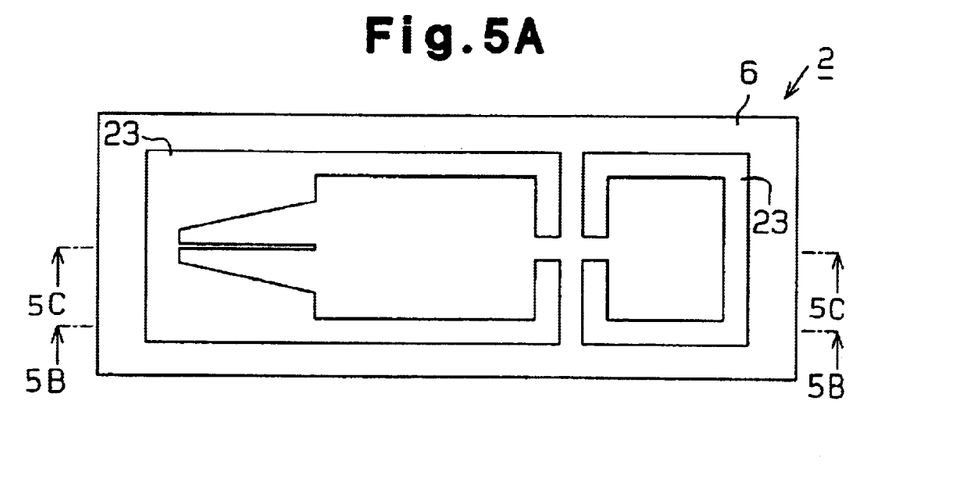
FIG. 5A is a schematic plan view of the silicon chip illustrating a procedure for manufacturing the acceleration switch of FIG. 3A.
Figure 5B:
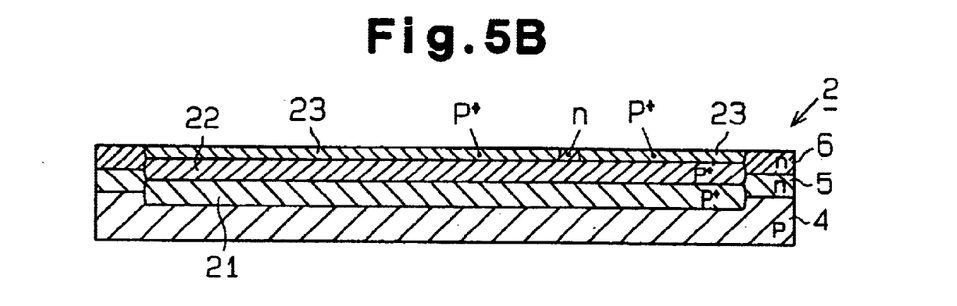
FIG. 5B is a cross-sectional view taken along line 5B—5B in FIG. 5A.
Figure 5C:
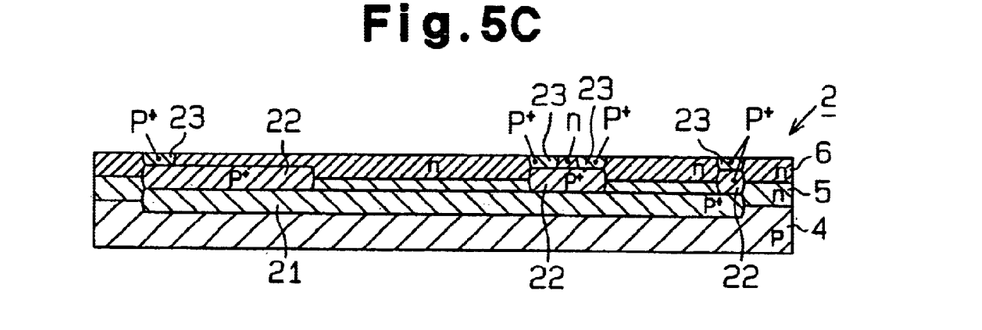
FIG. 5C is a cross-sectional view taken along line 5C—5C in FIG. 5A.
Figure 6A:
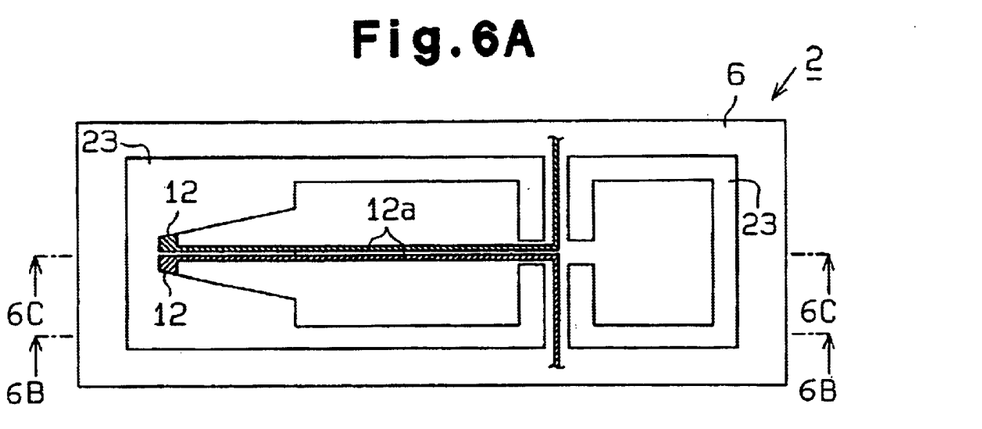
FIG. 6A is a schematic plan view of the silicon chip illustrating a procedure for manufacturing the acceleration switch of FIG. 3A.
Figure 6B:
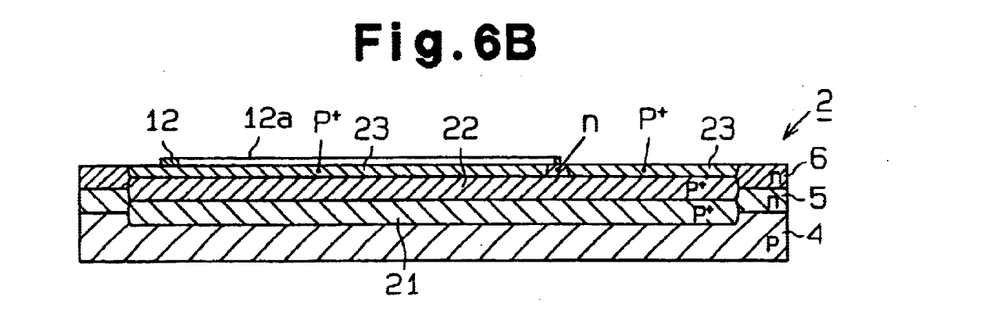
FIG. 6B is a cross-sectional view taken along line 6B—6B in FIG. 6A.
Figure 6C:
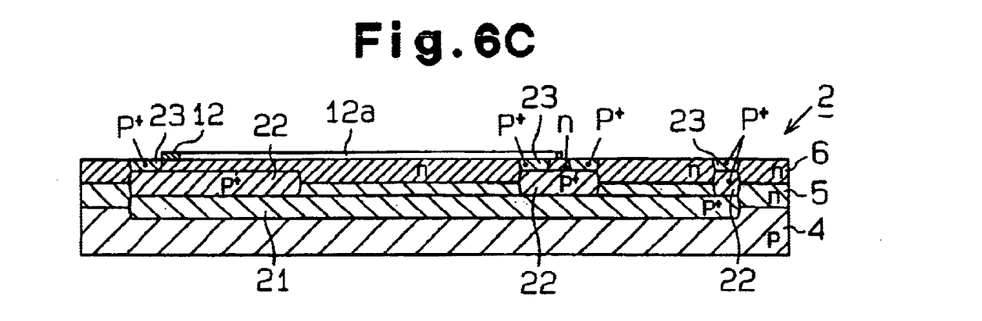
FIG. 6C is a cross-sectional view taken along line 6C—6C in FIG. 6A.
Figure 7A:
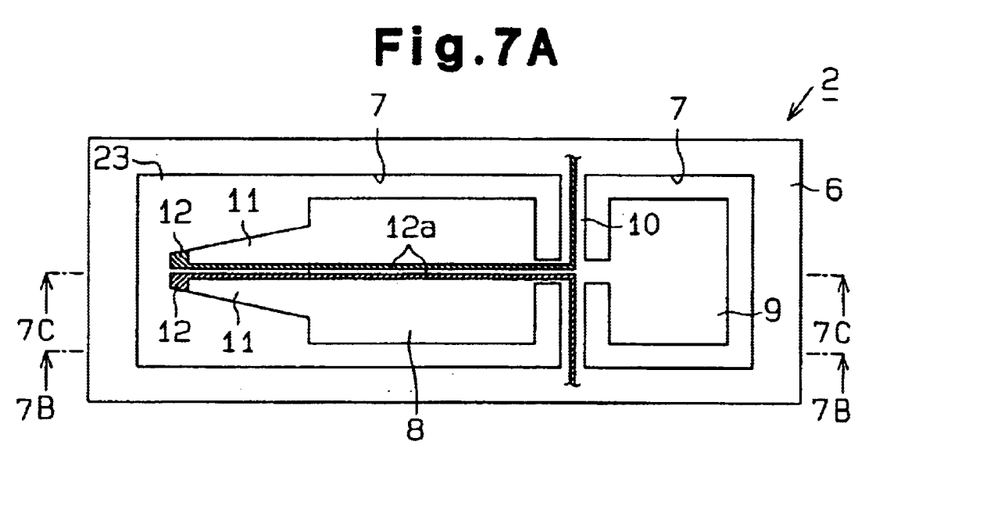
FIG. 7A is a schematic plan view of the silicon chip illustrating a procedure for manufacturing the acceleration switch of FIG. 3A.
Figure 7B:
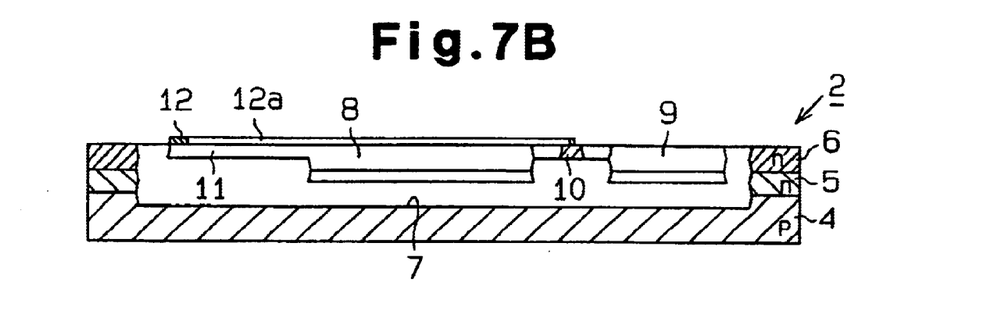
FIG. 7B is a cross-sectional view taken along line 7B—7B in FIG. 7A.
Figure 7C:
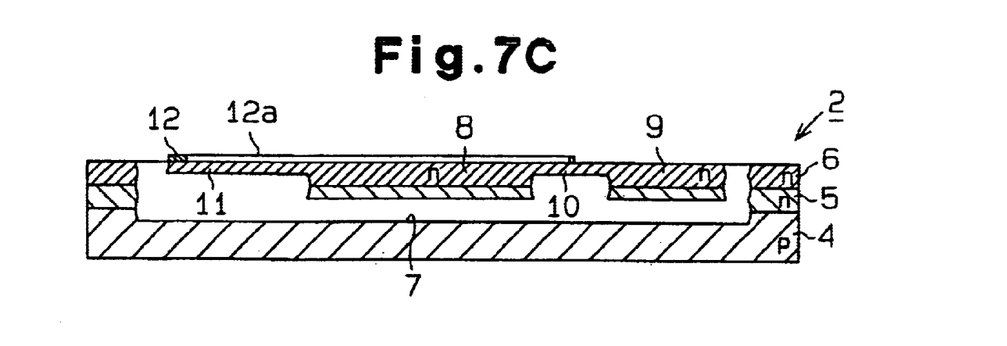
FIG. 7C is a cross-sectional view taken along line 7C—7C in FIG. 7A.

The inertial weight 8 and the balancer 9 are rectangular and each have a thickness of about 20 $\mu$m. The inertial weight 8 is larger and heavier than the balancer 9. The beam 10 is generally cross-like when seen from above and formed between the inertial weight 8 and the balancer 9. The beam 10 has a thickness of about 7.5 $\mu$m and is flexible. The beam 10 has a set of two opposing ends facing each other, which are connected to the chip body 4, and another set of two opposing ends, which are connected to one side of the inertial weight 8 and one side of the balancer 9. The inertial weight 8 and the balancer 9 are supported by the beam 10 and are pivotal about the beam 10.

The two flexible plates 11 are formed integrally with the inertial weight 8 at the side of the beam 10 that is opposite to the side connected to the inertial weight 8. The flexible plates 11 are each arranged on the distal end of the inertial weight 8 and spaced from the beam 10. The flexible plates 11 are each trapezoidal when seen from above and become narrower from the proximal end toward the distal end. The thickness of each flexible plate 11 is about 7.5 $\mu$m, which is about the same as the thickness of the beam 10. The flexible plates 11 are each formed at the generally middle part of the side of the inertial weight 8. The lower surface of the flexible plates 11 is flush with lower surface of the inertial weight 8.

The flexible plates are formed close to each other. More specifically, the gap between the flexible plates 11 is about 10 $\mu$m to 200 $\mu$m. In the present embodiment, the gap is about 40 $\mu$m. A movable electrode 12 is arranged on the distal end of the lower surface of each flexible plate 11. The width of each movable electrode 12 is the same as the width of the distal end of each flexible plate 11. The movable electrodes 12 are each connected to an external terminal, which is not shown, by a wiring pattern 12a, which is formed on the flexible plates 11, the inertial weight 8, and the beam 10.

The substrate 3 is rectangular and has the same shape as the silicon chip 2. In the present embodiment, a glass substrate is used as the insulative substrate 3. Alternatively, for example, a silicon substrate may be used. A rectangular hollow portion 13 is defined in the inner surface of the substrate 3. The hollow portion 13 is formed at a position corresponding to the hollow portion 7 of the silicon chip 2 through, for example, etching. The substrate 3 and the silicon chip 2 are bond to each other using a known anode bonding technique. However, the substrate 3 and the silicon chip 2 may be, for example, adhered to each other with an adhesive instead of using the anode bonding technique.

A fixed electrode 14 is formed in the inner surface of the hollow portion 13 at a position corresponding to the movable electrodes 12. Thus, the movable electrodes 12 contact the fixed electrode 14 when the inertial weight 8 pivots and the flexible plates 11 incline toward the substrate 3. In this state, the movable electrodes 12 are electrically connected by the fixed electrode 14.

An example of a procedure for manufacturing the acceleration switch 1 of the present embodiment using a surface micro-machining technique will now be described with reference to FIGS. 4 to 7.

The substrate 3 used in the acceleration switch 1 is manufactured as follows. First, a rectangular glass substrate (e.g., Pyrex glass) is etched to form a hollow portion 13 having a predetermined shape at one position in the inner surface of the substrate 3. Then, after masking the glass substrate, conductive metal (e.g., aluminum Al) is sputtered to form the fixed electrode 14 in the inner surface of the hollow portion 13. In lieu of a dry film forming process, such as sputtering, a wet film forming process such as electroless plating may be employed.

The manufacturing procedure of the silicon chip 2 will now be described. First, a mask, which is not shown, is applied to the top surface of a chip body 4. The chip body 4 is then photoetched to form an opening in a predetermined area of the mask. Then, the surface of the chip body 4 undergoes an ion implantation process to implant a predetermined concentration of p-type impurities, such as boron. The p-type impurities are then thermally diffused. This forms a first high concentration p-type silicon layer (lower $p^+$ silicon implantation layer) 21 (see FIGS. 4B, 4C) in the predetermined portion of the silicon chip 2. The portion in which the lower $p^+$ silicon implantation layer 21 is formed corresponds to where the hollow portion 7 will be subsequently formed.

Vapor phase growth causes the first epitaxial growth layer 5, which is made of n-type monocrystal silicon, to be formed on the entire top surface of the chip body 4 on which the $p^+$ silicon implantation layer 21 has been applied. As a result, the $p^+$ silicon implantation layer 21 is implanted in the first epitaxial growth layer 5 (see FIGS. 4B, 4C). Then, a mask, which is not shown, is applied to the first epitaxial growth layer 5 and photoetched to form an opening at a predetermined area of the mask. In this state, for example, ion implantation is performed to implant p-type impurities. The implanted p-type impurities are then thermally diffused. This forms a second high concentration p-type silicon layer (upper $p^+$ silicon implantation layer) 22 in the first epitaxial growth layer 5. The upper $p^+$ silicon implantation layer 22 extends to the lower $p^+$ silicon implantation layer 21, which has already been formed. The portion in which the upper $p^+$ silicon implantation layer 22 is formed also corresponds to the area where the hollow portion 7 will be formed later. The portion that is masked when forming the upper $p^+$ silicon implantation layer 22 corresponds to a side of an area, in which the inertial weight 8 and the balancer 9 will be subsequently formed.

Subsequently, vapor phase growth causes the second epitaxial growth layer 6, which is made of n-type monocrystal silicon, to be formed on the entire top surface of the first epitaxial growth layer 5. As a result, the upper $p^+$ silicon implantation layer 22 is implanted in the second epitaxial growth layer 6 (see FIGS. 4B, 4C). Then, a mask (not shown) is applied to the second epitaxial growth layer 6 and photoetched to form openings at predetermined portions. The implantation of impurities and thermal diffusion are performed on p-type impurities. The p-type impurities are thermally diffused. This forms a third high concentration p-type silicon layer ($p^+$ silicon diffusion layer) 23 in the first and second epitaxial growth layers 5, 6 (see FIGS. 5B, 5C). The $p^+$ silicon diffusion layer 23 extends to the upper $p^+$ silicon implantation layer 22. The portions in which the third high concentration p-type silicon layer ($p^+$ silicon diffusion layer) 23 is formed correspond to a portion, in which the hollow portion 7 will subsequently be formed. The portions that are masked when forming the $p^+$ silicon diffusion layer 23 correspond to areas in which the inertial weight 8, the balancer 9, the beams 10, and the flexible plates 11 are formed. In other words, the $p^+$ silicon diffusion layer 23 is formed to leave space for forming the inertial weight 8, the balancer 9, the beam 10, and the flexible plates 11.

After the high concentration p-type silicon layer forming process is completed, the silicon chip 2 is heated in the presence of oxygen or in the air to form an oxidation film, which is not shown, on the top and bottom surfaces of the silicon chip 2. In this state, Al is sputtered or vapor deposited on the oxidation film. Then, photolithography is performed. This forms the movable electrodes 12 and the wiring pattern 12a on the surface of areas where the inertial weight 8 and the flexible plates 11 will be formed later.

Subsequently, sputtering or vapor deposition of, for example, tungsten (W) or molybdenum (Mo) is performed on the silicon chip 2. The silicon chip 2 also undergoes photolithography to form a metal protection film (not shown) having openings. Afterward, the oxidation film is removed from portions corresponding to the openings of the metal protection film to expose the upper surface of the $p^+$ silicon diffusion layer 23, which is hidden under the film. W and Mo are selected because these metals resist hydrofluoric acid.

After the masking process is completed, the silicon chip 2 undergoes an anode conversion process as described below.

A high concentration hydrofluoric acid (HF) solution, which is an anode conversion acid solution, is filled in an anode conversion treatment tank. Counter electrodes, which are formed from, for example, platinum, and the silicon chip 2, which is faced toward the counter electrodes, are immersed in the hydrofluoric acid solution. An anode of a direct current power supply is connected to the rear surface of the silicon chip 2 while a cathode of the direct current power supply is connected to the counter electrodes. Thus, direct current flows from the back surface to the upper surface of the silicon chip 2. This results in the portions formed from high concentration p-type silicon in the silicon chip 2 (i.e., $p^+$ silicon implantation layers 21, 22 and the $p^+$ silicon diffusion layer 23) becoming selectively porous. Therefore, the first to third high concentration p-type silicon layers 21, 22, 23 are reformed into porous silicon layers in the block.

Subsequent to the anode conversion process and prior to the removal of the metal protection film, alkali etching is performed.

A substance such as tetramethylammonium hydroxide (TMAH) is used as the etchant. The etching dissolves the porous silicon layers. The porous silicon layer, which defines a reformed portion, is easily dissolved by alkali in comparison to a densified silicon layer, which defines a non-reformed portion. Thus, the porous silicon layers are easily hollowed out to form the hollow portion 7. This also forms the movable portion M1 in the hollow portion 7 (see FIGS. 7A, 7B, 7C). The silicon chip 2 is then reversed and attached to the substrate 3. This completes the acceleration switch 1 of FIG. 3A.

Figure 8:
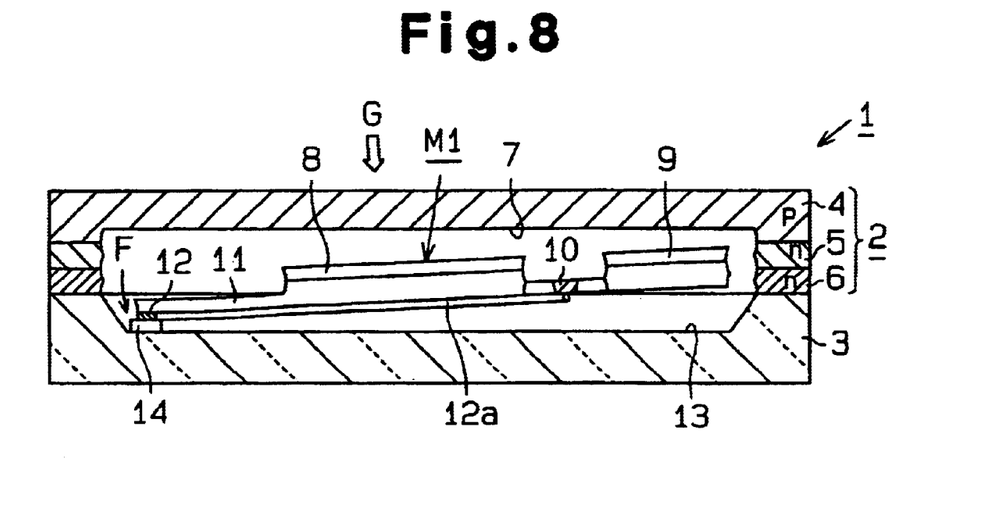
FIG. 8 is a schematic cross-sectional view showing a state in which acceleration is applied to the acceleration switch of FIG. 3A.
Figure 9:
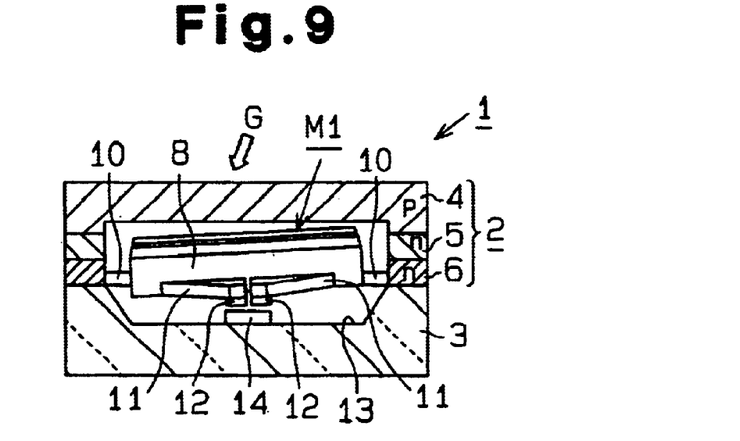
FIG. 9 is a schematic cross-sectional view showing a state in which acceleration is applied to the acceleration switch in FIG. 3A from an unexpected direction.

The operation of the acceleration switch 1 will now be described. Referring to FIG. 8, when acceleration is applied to the acceleration switch 1, inertial force is applied to the movable portion M1 in the direction of arrow G. When the acceleration applied to the acceleration switch 1 becomes greater than or equal to a predetermined value, the inertial weight 8 pivots downwardly about the beams 10, as shown by arrow F in FIG. 8. In this state, inertial force is applied to the balancer 9 in the same manner. However, the inertial weight 8 is heavier than the balancer 9 in the mass. Thus, the inertial weight pivots downwardly. The two movable electrodes 12 contact the fixed electrode 14, and the two movable electrodes are electrically connected (activated) by the fixed electrode 14.

On the other hand, when acceleration smaller than the predetermined value is applied to the acceleration switch 1, the inertial weight 8 does not pivot about the beams 10. Therefore, even if the beam 10 has some flexibility, the inertial weight 8 avoids moving to a predetermined position. This prevents the both movable electrodes 12 from being electrically connected. That is, the acceleration switch 1 is activated only when acceleration applied to the acceleration switch becomes greater than or equal to the predetermined value.

Figure 10A:
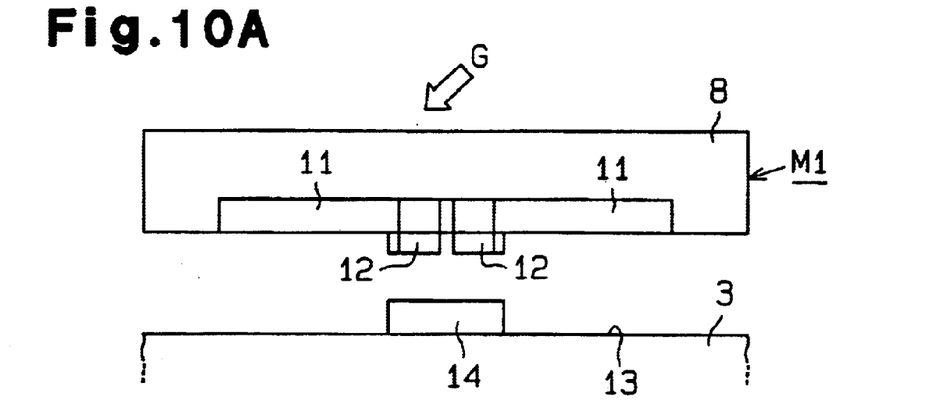
FIGS. 10A to 10C are schematic enlarged views showing the movement of a movable portion in a state in which acceleration is applied to the acceleration switch in FIG. 3A from an unexpected direction.
Figure 10B:
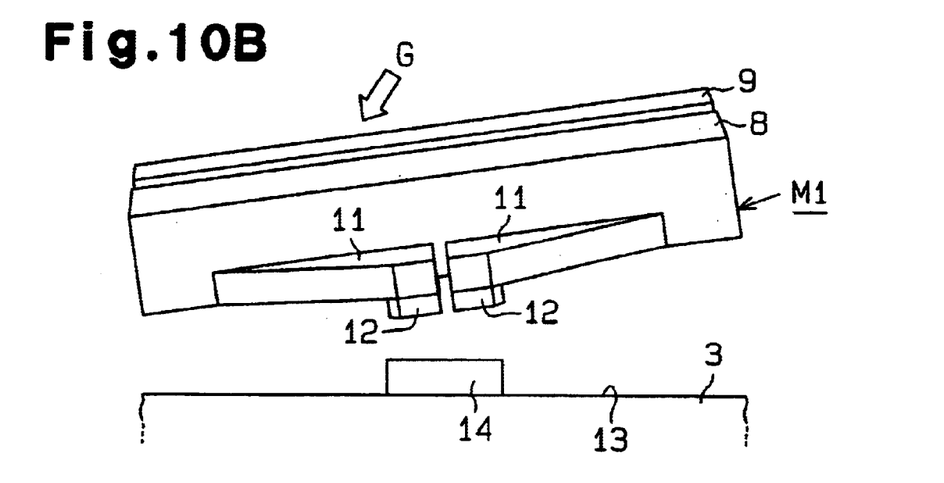
Figure 10C:
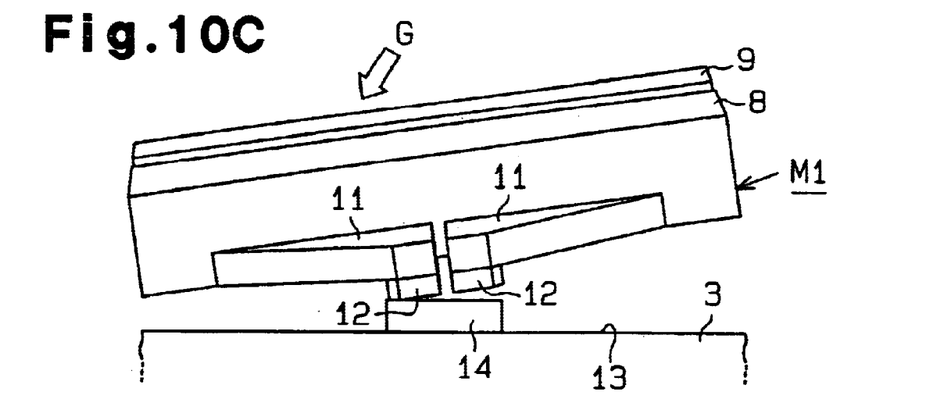

Acceleration may be applied to the acceleration switch 1 from a direction other than a predetermined detection direction (unexpected direction). Referring to FIG. 10, a direction of inertial force is indicated by arrow G when acceleration is applied from an unexpected direction. The inertial weight 8 twists and pivots when acceleration is greater than or equal to the predetermined value, as shown in FIG. 10. The operation of the acceleration switch 1 when acceleration is applied from an unexpected direction, will now be described with reference to FIGS. 10 and 11.

A twisting force is applied to the beam 10 when inertial force greater than or equal to the predetermined value is applied to the inertial weight 8 from an unexpected direction, as shown by arrow G in FIG. 10A. Accordingly, the twisted inertial weight 8 starts to pivot downwardly, as shown in FIG. 10B. Since each flexible plate 11 is sufficiently thin as compared with the inertial weight 8, the inertial force applied to each flexible plate 11 due to acceleration is small. Therefore, the inertial force is applied substantially only to the inertial weight 8. The flexible plates 11 do not bend about the portion connected with the inertial weight 8 when acceleration is applied. Therefore, each flexible plate 11 pivots integrally with the inertial weight 8.

Figure 11A:
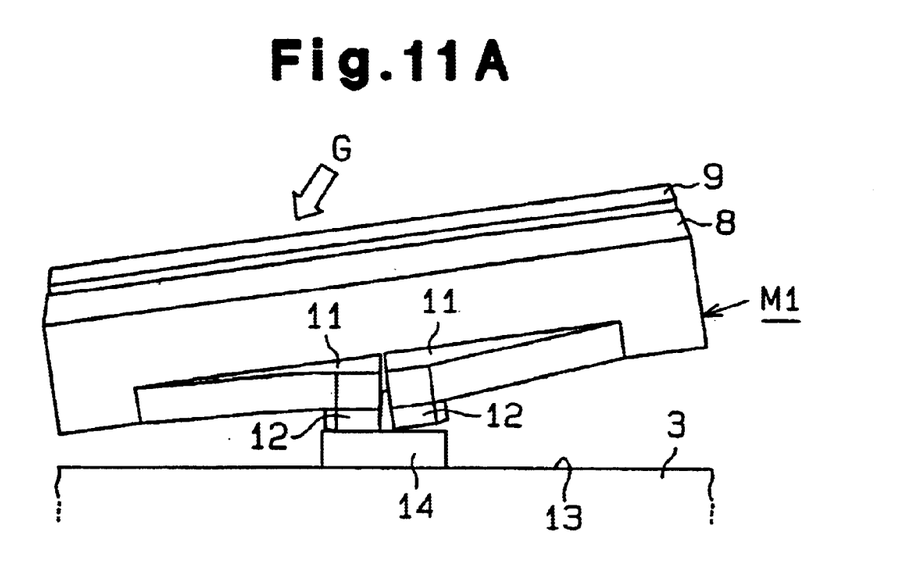
FIGS. 11A and 11B are enlarged views schematically showing the movement of a movable portion when acceleration is applied to the acceleration switch of FIG. 3A from an unexpected direction.
Figure 11B:
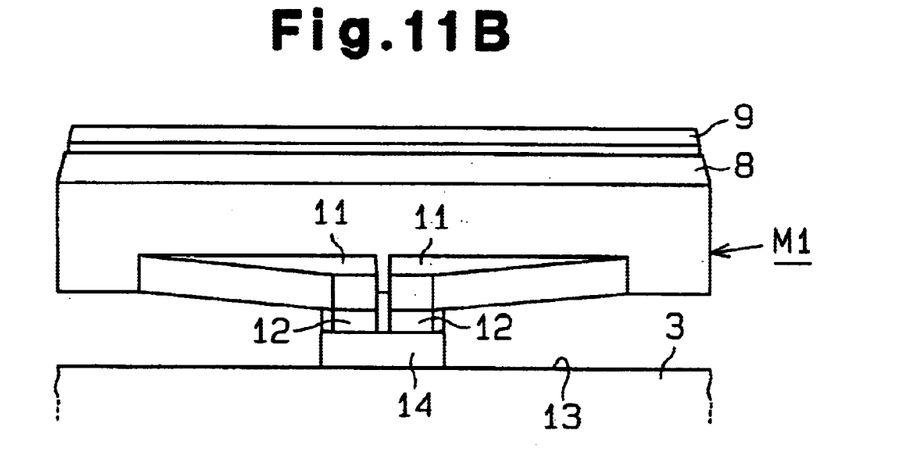

One of the movable electrodes 12 contacts the fixed electrode 14 as the inertial weight 8 pivots downwardly, as shown in FIG. 10C. Since inertial force is still applied to the inertial weight 8 in this state, the inertial weight 8 continuously pivots in a downward direction. Referring to FIG. 11A, further pivoting of the inertial weight 8 causes the flexible plate 11 contacting the fixed electrode 14 to bend. Since the flexible plate 11 is independent from each other, the bending flexible plate 11 does not influence the other flexible plate 11. Thus, as the inertial weight 8 further pivots downward, one of the flexible plates 11 downwardly moves while the other flexible plates 11 bend while keeping contact with the fixed electrode 14. Accordingly, the movable electrode 12 of the other flexible plate 11 also contacts the fixed electrode 14, as shown in FIG. 11B.

In the switch 1 according to the present embodiment, contact of the movable electrodes 12 with the fixed electrode 14 is guaranteed even if acceleration that is greater than or equal to the predetermined value is applied to the inertial weight 8 from an unexpected direction. Accordingly, the operation of the acceleration switch 1 is guaranteed.

The acceleration switch 1 according to the embodiment has the following advantages.

(1) Since the two flexible plates 11, each provided with the movable electrode 12, elastically flex separately, the movable electrodes 12 move separately when the flexible plates 11 are flexed. Therefore, even if only one of the movable electrodes 12 contacts the fixed electrode 14 when acceleration is applied to the acceleration switch 1 from an unexpected direction, the other movable electrode 12 moves separately from the former movable electrode 12 and contacts the fixed electrode 14. Accordingly, the activation of the acceleration switch 1 is guaranteed even when acceleration is applied from an unexpected direction.

(2) The flexible plates are each thinner than the inertial weight 8. This ensures elastic flexing of each flexible plate 11. In addition, the flexible plates are less influenced by inertial force.

Further, since the thickness of the flexible plates 11 is the same as that of the beams 10 in the present embodiment, the flexible plates 11 are formed in the same process as the beams 10 when manufacturing the silicon chip 2. Therefore, the number of processes for manufacturing the silicon chip 2 is prevented from increasing.

(3) The width of the distal end of the flexible plates 11 is substantially the same as that of the movable electrodes 12. This ensures that the movable electrodes 12 contact the fixed electrode 14 when the flexible electrodes move downwardly in a twisted state.

(4) The flexible plates 11 are each generally trapezoidal and become narrower toward the distal end. This increases the strength connecting the flexible plates 11 and the inertial weight 8 to each other.

(5) The flexible plates 11 are each formed close to each other. This reduces the time for the movable electrodes 12 to contact the fixed electrode 14 when inertial force is applied to the inertial weight 8 from an unexpected direction.

(6) The lower surface of each flexible plate is flush with the lower surface of the inertial weight 8 at substantially the middle of one side of the inertial weight 8. Accordingly, even if the inertial weight 8 pivots in a twisted state, the movable electrodes each contact the fixed electrode 14.

It should be apparent to those skilled in the art that the present invention may be embodied in many other specific forms without departing from the spirit or scope of the invention.

Figure 12A:
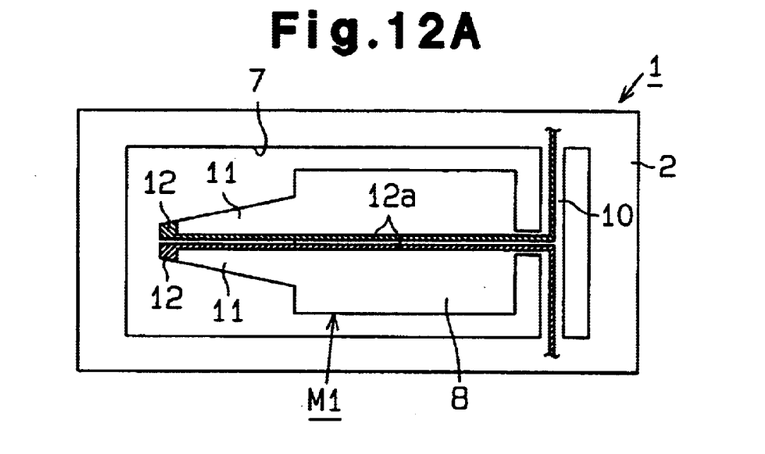
FIGS. 12A to 12C are schematic bottom views of a silicon chip of an acceleration switch according to further embodiments.

As shown in FIG. 12A, the balancer 9 may be omitted. In this case, the acceleration switch 1 is miniaturized.

Figure 12B:
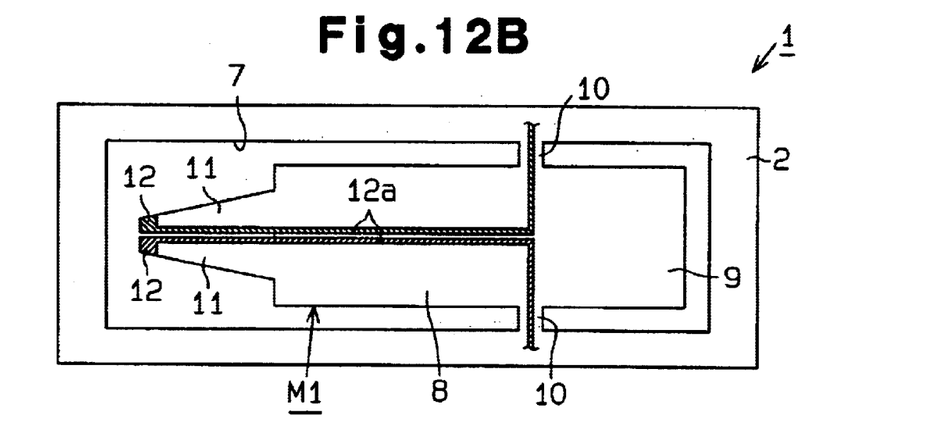

As shown in FIG. 12B, the beams 10 may be formed such that the beams 10 support both sides of the inertial weight 8 and the balancer 9, which are integrally formed with each other.

Figure 12C:
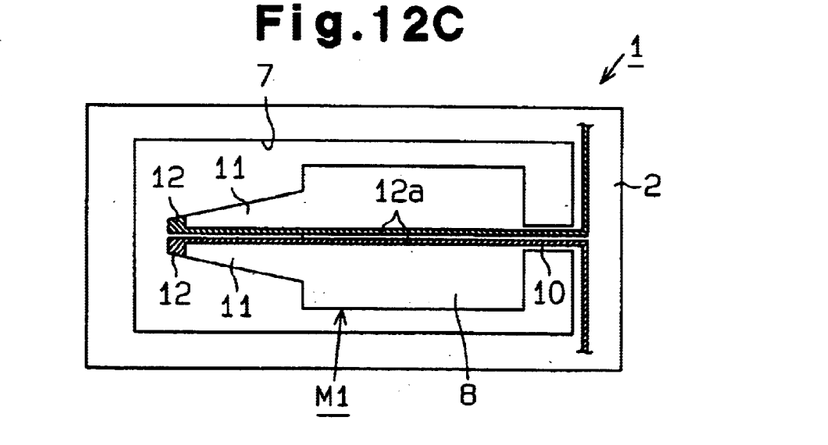

As shown in FIG. 12C, the beams 10 may be formed to pivotally support the side of the inertial weight 8 that is opposite to the side, in which the flexible plates 11 are arranged.

The flexible plates 11 do not have to have the same thickness as the beams 10 as long as the flexible plates 11 are at least thinner than the inertial weight 8 and elastically flexible.

The flexible plates 11 do not have to be generally trapezoidal and may be rectangular or rod-like.

The flexible plates 11 each may be spaced away from each other.

The flexible plates 11 may entirely be formed from conductive metal. Further, the entire flexible plate 11 may be formed as a movable electrode.

What is claimed is:

1. An acceleration switch comprising:

a movable portion, which has a movable electrode; and a fixed electrode, wherein movement of the movable portion in accordance with application of acceleration causes the movable electrode to contact the fixed electrode, wherein the movable portion includes:

an inertial weight moved in accordance with the application of acceleration;

a beam portion for pivotably supporting the inertial weight; and a plurality of flexible plates that are arranged in the inertial weight, each flexible plate having a distal end in which the movable electrode is located, the flexible plates being flexed separately from one another, each flexible plate being formed to become narrower toward its end, and the width of the distal end of each flexible plate being substantially equal to the width of the movable electrode.

2. The acceleration switch according to claim 1, wherein the movable portion is made of silicon.

3. The acceleration switch according to claim 1, wherein the flexible plates are each thinner than the inertial weight.

4. The acceleration switch according to claim 1, wherein the flexible plates each have a generally trapezoidal flat surface.

5. The acceleration switch according to claim 1, wherein the flexible plates are arranged close to each other.

6. The acceleration switch according to claim 5, wherein the gap between the flexible plates is about 10 $\mu$m to 200 $\mu$m.

7. The acceleration switch according to claim 6, wherein the gap between the flexible plates is about 40 $\mu$m.

8. The acceleration switch according to claim 1, wherein the thickness of the flexible plates is substantially equal to the thickness of the beam portion.

* * * * *